United States Patent
Schlett et al.

[19]

[11] Patent Number: 5,845,929
[45] Date of Patent: Dec. 8, 1998

[54] COVERING MEANS FOR AIR-BAG-COLLISION-SAFETY MEANS AS WELL AS PROCESS FOR THE PRODUCTION THEREOF

[75] Inventors: Egon Schlett; Rudolf Helfrich, both of Aschaffenburg; Norbert Väth, Esselsbach, all of Germany

[73] Assignee: Petri AG, Aschaffenburg, Germany

[21] Appl. No.: 446,012

[22] Filed: May 19, 1995

[30] Foreign Application Priority Data

May 21, 1994 [DE] Germany .................. 44 17 952.9

[51] Int. Cl.⁶ .................................................. B60R 21/20
[52] U.S. Cl. ........................................ 280/728.3; 428/218
[58] Field of Search ................... 280/728.3, 731, 280/732, 728.1; 428/36.5, 218, 212

[56] References Cited

U.S. PATENT DOCUMENTS

| | | | |
|---|---|---|---|
| 4,120,516 | 10/1978 | Takamatsu et al. | 280/728.3 |
| 4,891,085 | 1/1990 | Mulligan | 428/218 |
| 5,110,647 | 5/1992 | Sawada et al. | 280/728.3 |
| 5,316,822 | 5/1994 | Nishijima et al. | 280/728.3 |
| 5,470,634 | 11/1995 | Persson et al. | 280/728.3 |

FOREIGN PATENT DOCUMENTS

| 2703012 | 9/1994 | France | 280/728.3 |
|---|---|---|---|
| 1-122753 | 5/1989 | Japan | 280/728.3 |

*Primary Examiner*—Peter C. English
*Attorney, Agent, or Firm*—McGlew and Tuttle

[57] ABSTRACT

A covering device for air-bag-collision-safety systems, including a cap formed of a frame and a cover. The cover is provided with predetermined tear lines forming cover sections, whereby the cover sections are connected in a hinge manner with the frame. The covering device is injection molded of a foamed thermoplastic material, especially an elastomer. Areas of various layer thicknesses lying in the gripping area of the user, such that the surface layers lying in the gripping area of the user, as well as the areas of the covering device used for attachment have a lower pore volume and correspondingly a higher density and hardness between 50 Shore A and 75 Shore D. A layer having a characteristic foamed structure is formed under the surface layers lying in the gripping area of the user, whereby the thickness ratio between the thicker surface layer and the foamed structure is 1 at the most. The foaming takes place while the volume of the mold is stepwise or continuously increased, whereby either the mold halves are separated on a preset path while the pressure in the mold is correspondingly reduced, or parts of the mold are drawn back in the cavity at certain preset points while the pressure in the mold is correspondingly reduced.

4 Claims, 3 Drawing Sheets

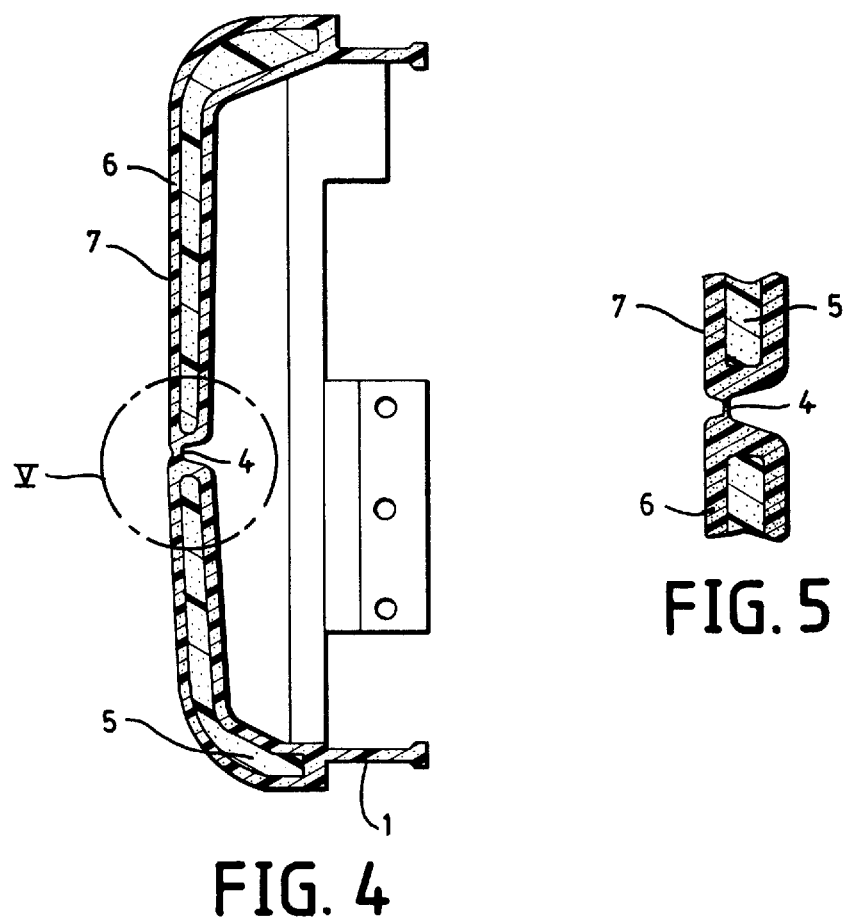

COVERING MEANS FOR AIR-BAG-COLLISION-SAFETY MEANS AS WELL AS PROCESS FOR THE PRODUCTION THEREOF

FIELD OF THE INVENTION

The present invention is based on a covering device for an air-bag-collision-safety system including a cap comprising a frame and a cover. The cover is provided with predetermined tear lines forming cover sections, the cover sections being connected in a hinge-like manner with the frame.

BACKGROUND OF THE INVENTION

Very diverse requirements are placed on the covering caps of air-bag-collision-safety means. On the one hand, they may not hinder the enclosed air bag in its function, i.e., they must reliably tear open in the case of danger; they may also not be a danger to the vehicle passengers in such a situation, i.e., they must possess a strength that guarantees the tearing off of parts; and finally, they should account for aesthetic requirements, i.e., they should especially have an attractive appearance and a surface that is easy to handle. The prior-art covering means do not completely satisfy the requirements placed especially on the appearance and a cost-favorable production.

Thus, covering caps, which consist of a frame made of a polymer fabric, steel or a thermoplastic material, onto which a coating of polyurethane foam is applied, are known for this purpose. The foaming procedure is technically extraordinarily problematic and consequently has a high reject rate.

In addition, a covering cap for the above-mentioned purpose has become known, which is produced in one piece such that the production expense relating to the reinforcement is omitted. The reinforcement, however, is limited, due to the fulfillment of the requirements relating to strength, to the use of materials, which themselves do not form a smooth surface and must therefore be provided with a lacquering.

Covering caps of this type are known, which are injection-molded as two-layer injection molds made of thermoplastic material, the first layer of which is produced as a support with the necessary mechanical strength and the second layer of which is produced as a soft, covering decorative layer. Even in this case, the application of a lacquering as a visible surface is necessary.

In all prior-art embodiments of a covering cap, there is the additional fact that the tear-open lines cannot be concealed, but rather remain as flute-like or groove-like depressions on the surface in an undesirable manner.

SUMMARY AND OBJECTS OF THE INVENTION

The primary object of the present invention is to create a covering means which can be produced in a simple manner and which satisfies all functional requirements.

According to the invention, a covering device for air-bag collision safety systems is provided including a cap formed of a frame and a cover. The cover is provided with predetermined tear lines forming cover sections. The cover sections are connected in a hinge-like manner with the frame. The covering device includes an injection molded element of foamed thermoplastic material. Preferably, the foamed thermoplastic material is an elastomer. Areas of the various layer thicknesses lying in the gripping area of the user, such as the surface layers lying in the gripping area of the user, as well as the areas of the covering used for attachment, have a lower pore volume and correspondingly a higher density and a hardness between 50 Shore A and 75 Shore D. A layer having a characteristic foamed structure and consequently a lower density and hardness is formed under the above mentioned surface layers (the layers lying in the gripping area of the user). A thickness ratio is provided between the thicker surface layer and the foamed structure which is 1 at the most (the ratio of surface layers lying in the gripping area of the user to foamed structure is less than or equal to 1).

A covering means for an air-bag-collision-safety means, which can be produced in one work cycle without separate reinforcement and which has, on the one hand, the functionally necessary high strength due to its unfoamed core, as well as, on the other hand, a flat and easy-to-handle visible surface due to the foaming and formation of a smoothened surface coating during the foaming process without secondary processing, for example, by lacquering, is created by means of the present invention.

The foamed body is foamed on a support, which support is provided as a blank mold. The thermoplastic material is foamed and the foaming takes place with a stepwise or continuous increase in the volume of the mold. The mold halves are preferably separated on a preset path while the pressure in the mold is correspondingly reduced. As the volume of the mold increases, the foaming takes place such that the parts of the mold are drawn back into the cavity at certain preset points while the pressure in the mold is correspondingly reduced. The covering device is produced entirely in a mold having two cavities, such that, primarily, a support is injection molded in the first cavity and is entirely transferred to the other cavity, in which the foam injection molding of the other layers takes place. For example, the support is transferred including the mold core.

Predetermined tear lines are formed by corresponding constrictions in the injection mold. In these constrictions, the thermoplastic material immediately freezes (solidifies, hardens) so that lines are formed made of unfoamed material having a low material strength and a high density. As an alternative, the layer of the foamed part lying on the inside of the covering means may be mechanically notched, milled out or cut out in a groove like manner, or otherwise cut at a preset depth for forming the predetermined tear lines.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a section according to A—A through FIG. 1;

FIG. 5 is an enlarged partial view of the zone of the middle tear-open line circled in FIG. 4;

DETAILED DESCRIPTION OF THE PREFERRED EMBODIMENT

Figure 2:
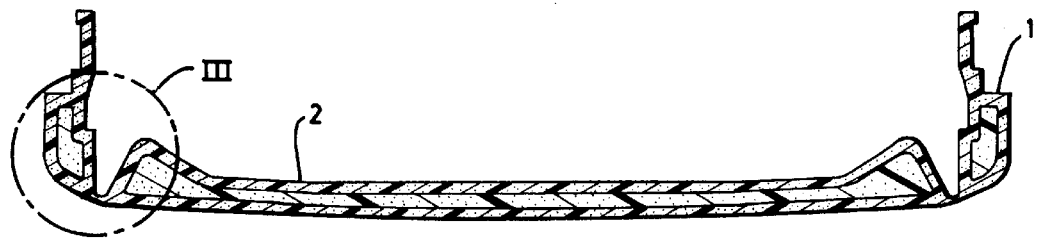
FIG. 2 is a section according to B—B through FIG. 1.
Figure 1:
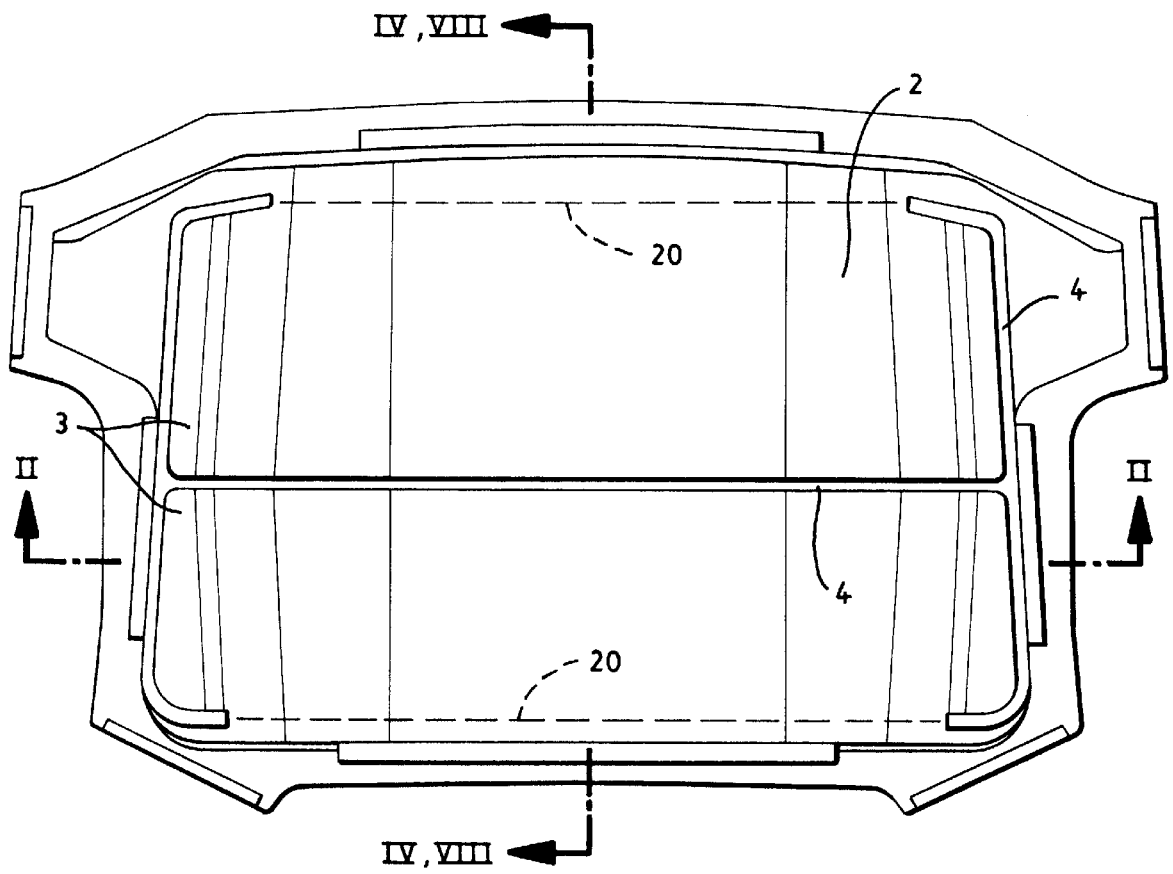
FIG. 1 is an inside view of a covering means for an air-bag-collision-safety means.

The covering structure for an air-bag-collision-safety means shown in the drawing is comprised of a frame 1 and a cover, which is designated as a whole by 2, which together form the cap-like covering structure. In the example shown, tear-open lines 4 form two flap-like cover sections 3. The flap-like sections 3 are connected in a hinge-like manner with the frame edge 1 along hinge lines (hinge-like connection region) 20 running between the end points of the said tear-open lines 4. The tear open lines 4 are formed in the cover along a middle longitudinal line as well as along diagonal lines on the edges.

The covering structure is formed of an injection mold made of a foamed thermoplastic material, especially a polyamide or polyester elastomer, with regions or portions 5, 6 of different thickness. The surface regions 6 lying in the gripping area of the user, as well as the areas 1 of the covering means being used for attachment, have a lower pore volume and correspondingly a higher density and hardness between 50 Shore A and 75 Shore D. The region 5 has a characteristic foamed structure and consequently a lower density and hardness. The region 5 is formed under the said surface layers 6 (under the layer that lies in the gripping area of the user). In this case, the thickness ratio between the thicker surface region 6 and the said foamed structure 5 is 1 at the most, so that, in general, the thickness of the foamed structure exceeds the thickness of the surface region of higher density. The formation of the regions of different physical properties is carried out in that the foaming takes place with a stepwise or continuous increase in the volume of the mold, whereby the increase in volume can be carried out by either the mold halves being separated on a preset path while the pressure in the mold is being correspondingly reduced or by part of the mold in the cavity being drawn back at certain preset points while the pressure in the mold is being correspondingly reduced. A surface layer 7 provides an outer surface for the foamed body.

Figure 3:
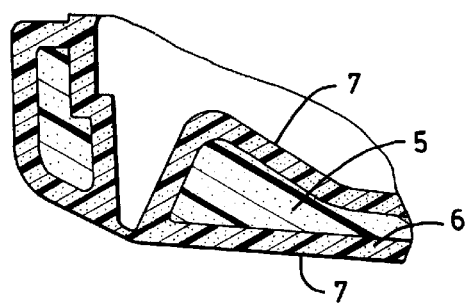
FIG. 3 is an enlarged partial view of one of the hinge zones of the covering means shown in FIG. 2.

The tear-open lines can be incorporated into the covering means at the same time as the injection molding procedure by means of the corresponding formation of the mold, i.e., constrictions or contractions, in which case the covering means, as a rule, is given the conventional appearance with a visible tear-open line. FIGS. 1–5, especially FIGS. 3 and 5 show such an embodiment. However, the covering means can be produced in a uniform mold having no visible notches to mark tear-open lines, in which case the said tear-open lines are subsequently marked by the simple mechanical notching or groove-like cutting out of the inner-lying foam region; as well as possibly of part of the support region. An absolutely well-proportioned visible surface is achieved by this production process. Such an embodiment is shown in FIGS. 6 and 7.

Figure 8:
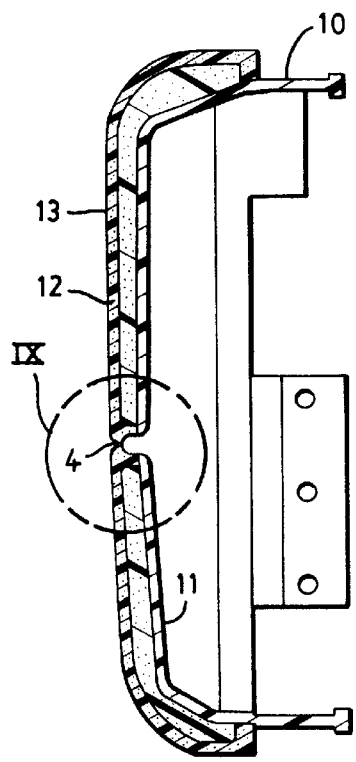
FIG. 8 is a section according to A—A of FIG. 1, showing another embodiment of the invention.
Figure 9:
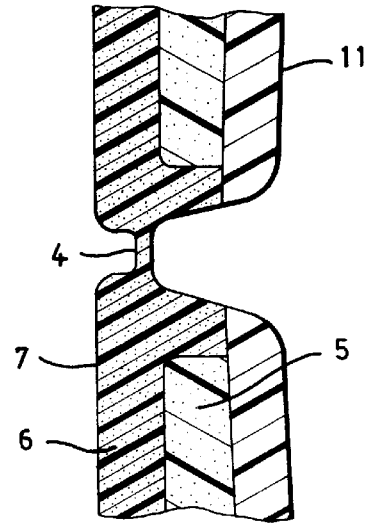
FIG. 9 is an enlarged partial view of the hinge zones of the embodiment of FIG. 8.

FIGS. 8 and 9 show another embodiment of a covering means according to the present invention, in which the foamed body 5, 6 (or 12, 13) is foamed on a support 11 produced as a blank mold in the same mold. It is produced, according to the present invention, in a mold having two cavities, such that, primarily, a support 11 with a high modulus of elasticity is injection-molded in the first cavity and is entirely, i.e., including the mold core, transferred to the other cavity, in which the foam injection molding of the other regions takes place in the manner shown above with zones or regions of varying density. With this construction (see FIG. 8), the areas 10 are used to attach the cap to the module consist of the same material as the support 11 and are manufactured at the same time as support 11, in the same mold.

Figure 6:
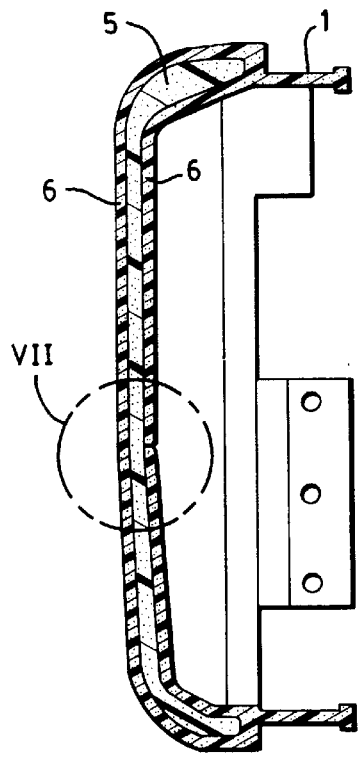
FIG. 6 is another embodiment of a covering means for an air-bag-collision-safety means.
Figure 7:
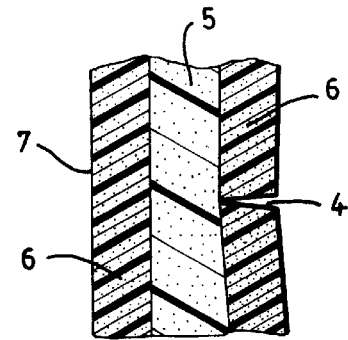
FIG. 7 is an enlarged partial view of the zone of the middle tear-open line circled in FIG. 6.

The tear-open lines can—as in the embodiment shown—be formed in the manner according to FIGS. 4 and 5 by applying appropriate constrictions in the injection mold, in which the thermoplastic material freezes immediately, so that lines of unfoamed material with low material strength and high density are formed; however, they may also—see FIGS. 6 and 7—be formed by the layer of the foamed part lying inside the covering means being mechanically notched, milled out or cut out a groove-like manner or otherwise cut at a preset depth.

While specific embodiments of the invention have been shown and described in detail to illustrate the application of the principles of the invention, it will be understood that the invention may be embodied otherwise without departing from such principles.

What is claimed is:

1. A covering device for air-bag-collision-safety systems, comprising a cap including:

a frame part;

a cover part, said cover part having predetermined tear lines to define cover sections; and a hinge connection region connecting said cover part to said frame part, each of said frame part, said cover part and said connection region being formed as a single foamed body of an injection molded foamed thermoplastic material, including a surface, lying in a gripping area of the user and including surface regions, said surface regions being disposed adjacent to said surface and adjacent to intermediate regions formed within said surface and within said surface regions, said surface and said surface regions having a lower pore volume and a correspondingly higher density and higher hardness than said intermediate regions, said intermediate regions having a foamed structure with a lower density and lower hardness than said surface regions and said surface, whereby a thickness ratio between said surface regions and said intermediate regions is less than or equal to 1.

2. A covering device for air-bag-collision-safety systems, according to claim 1, wherein said foamed body is formed on a support.

3. A covering device for air-bag-collision-safety systems according to claim 1, wherein said thermoplastic material is an elastomer.

4. A covering device for air-bag-collision-safety systems according to claim 1, further comprising attachment regions, wherein said attachment regions and said surface regions have a hardness between 50 Shore A and 75 Shore D.

* * * * *